United States Patent [19]

Pearman et al.

[11] Patent Number: 5,046,165

[45] Date of Patent: Sep. 3, 1991

[54] CONTROLLING THE COMBINING OF VIDEO SIGNALS

[75] Inventors: James B. Pearman, Basingstoke; David J. Hedley, Winchester, both of England

[73] Assignee: Sony Corporation, Tokyo, Japan

[21] Appl. No.: 469,367

[22] Filed: Jan. 24, 1990

[30] Foreign Application Priority Data

Apr. 7, 1989 [GB] United Kingdom ................ 8907876

[51] Int. Cl.[5] ........................ H04N 5/262; H04N 9/74

[52] U.S. Cl. ...................................... 358/183; 358/22; 340/734

[58] Field of Search ......................... 358/183, 22, 141; 340/730, 731, 734

[56] References Cited

U.S. PATENT DOCUMENTS

| | | | |
|---|---|---|---|
| 3,941,925 | 3/1976 | Busch et al. | 358/183 |
| 4,622,588 | 11/1986 | Chapuis et al. | 358/183 |
| 4,641,255 | 2/1987 | Hohmann | 358/183 |
| 4,673,983 | 6/1987 | Sarupaku et al. | 358/183 |
| 4,814,884 | 3/1989 | Johnson et al. | 358/183 |
| 4,853,784 | 8/1989 | Alt et al. | 358/183 |
| 4,891,705 | 1/1990 | Suzuki et al. | 358/183 |
| 4,961,114 | 10/1990 | White | 358/183 |

*Primary Examiner*—John K. Peng
*Attorney, Agent, or Firm*—Alvin Sinderbrand; William S. Frommer

[57] ABSTRACT

Apparatus for controlling the combining of video signals includes a field rate microprocessor (10) that generaes edge data defining the edges of a polygonal first picture (KP) which is to be keyed into a second picture (B) to produce a composite picture. Two line rate microprocessors (16, 18) generate from the edge data, for each horizontal scanning line of the composite picture in which a row of pixels corresponding to that scanning line is intersected by edges of the first picture, signals representing: the horizontal locations of first and second start pixels, namely those of the row of pixels in which first and second edges (e.g. E*b*, E2), respectively, of the first picture (KP) start to intersect the row; the gradients of the first and second edges; and a key value (the proportion of the first picture to be contained in a pixel of the composite picture) for each of the first and second start pixels. A key value generator (32) generates, for each scanning line of the composite picture, a key value for each successive one of the row of pixels corresponding thereto, by: ramping up the key value from zero, for pixels preceding the first start pixel, by incrementing the key value for the first start pixel, for pixels following the first start pixel, by an amount per pixel determined by the gradient of the first edge (e.g. E1), until the key vaue reaches unity; and ramping down the key value from unity, by decrementing the key value for the second start pixel, for pixels following the second start pixel, by an amount per pixel determined by the gradient of the second edge (e.g. E2), until the key value reaches zero.

17 Claims, 4 Drawing Sheets

KEY PICTURE ORIENTATION (FROM DVE COMPUTER CONTROL SYSTEM)
FIRST GRADIENT SIGNAL
KEY VALUE GENERATOR
32
16
FIRST LINE RATE MICRO-PROCESSOR
FIRST START KEY VALUE SIGNAL
22
38
50
24
12
FIRST START PIXEL LOCATION SIGNAL
FIRST ADDRESS COMP.
48
FIELD RATE MICRO-PROCESSOR
LOOK UP TABLE
16'
20
ALU
34
EDGE EQUATIONS DATA
SECOND GRADIENT SIGNAL
42
60
28
SECOND LINE RATE MICRO-PROCESSOR
62
COMP. AND CLIP CCT.
64
SECOND START KEY VALUE SIGNAL
54
10
14
30
KEY VALUE OUTPUT (TO MIXER)
SECOND START PIXEL LOCATION SIGNAL
SEQ.
18'
LOOK UP TABLE
SECOND ADDRESS COMP.
58
46
18
26
56
36
44
52
LINE ADDR. COUNTER
40

CONTROLLING THE COMBINING OF VIDEO SIGNALS

BACKGROUND OF THE INVENTION

1. Field of the Invention

This invention relates to controlling the combining of video signals.

2. Description of the Prior Art

It is often desired to produce a composite picture from two or more pictures represented by respective video signals. For instance, it is often required to inset or key a first picture ("key picture") represented by a first video signal into a second picture ("background picture") represented by a second video signal to form a composite picture. FIG. 1 of the accompanying drawings shows an example of such a composite picture, which comprises a key or foreground picture KP that is keyed or inset into a background picture B. The key picture KP may, again in a manner known per se, be produced by manipulating all or part of digitally stored fields of an input video signal in digital video effects (DVE) equipment. The manipulation may, for example, consist of or include rotation of all or part of a stored picture about one or more of three axes, FIG. 1 showing a case in which a basically rectangular picture having edges E1, E2, E3 and E4 has been manipulated in this way.

The production of a composite picture in this way gives rise to problems along the edges of the key picture. The reason for this resides in the spatial resolution of the pictures. In this regard, both the key picture and the background picture are represented by digital video signals which comprise samples representing respective square picture cells or pixels of the picture. That is, each picture can be considered to comprise an orthogonal array or grid of pixels, each horizontal row thereof being centred on a horizontal scanning line and the horizontal rows being spaced apart by the distance between the scanning lines. (See, in this regard, FIG. 2 of the accompanying drawings, which shows part of a picture divided into pixels P with the scanning lines represented at L.) Thus, the spatial resolution is determined by the pixel size, which is in turn determined by the number of lines per field or frame of the video system employed.

Obviously, in general, when a key picture is mixed into a background picture, the edges of the key picture will not coincide precisely with pixel boundaries. Instead, in general, the edges will intersect pixels. Therefore, when the pictures are keyed together, a decision has to be made on the picture content of each pixel intersected by an edge. Thus, if, for example, the decision is to the effect that each such pixel will comprise either wholly key picture or wholly background picture depending upon whether the majority of that pixel should be occupied by the key picture or background picture, respectively, the result is that the desired boundary between the pictures is in practice provided by a step-wise approximation thereto at pixel resolution. This can be more clearly appreciated by referring further to FIG. 2, in which the desired boundary is shown by a line B1 and the stepwise approximation thereto by a line B2. Thus, the actual edges of the key picture are jagged and there is aliasing between the key and background pictures. The degree of jaggedness becomes particularly noticeable when the edges are close to the horizontal or close to the vertical.

To avoid this type of aliasing, the edges must be defined to greater accuracy and smoothly interpolated. One way of doing this, employed in computer graphics, is to identify, by computation, each pixel crossed by an edge and to compute, for each pixel crossed by an edge, an appropriate value for the intensity of the pixel. It must be appreciated, however, that the edges may intersect with a very large number of pixels whereby the total time taken to perform the necessary computation for all of such pixels may be very long (in some cases in the order of hours), in fact so long that this approach is unfeasible for use in real time processing of video signals.

One approach to solving the above problem that is sufficiently fast for use in real-time video processing is the use of a two-dimensional digital low pass filter. By deriving a value for each pixel of the combined picture by a weighted combination of surrounding pixels, the filter hides the aliasing by, in effect, removing the jaggedness, which represents high frequency picture content. However, using such a filter leads to the disadvantage that the appearance of the edges is "soft", i.e. the edges are not sharply defined. This may be considered subjectively undesirable.

An object of this invention is to enable the combining of video signals in real time in such a manner that the edges of the key picture are processed to avoid (or at least reduce) jaggedness, yet the edge softness encountered by employing filtering is avoided.

SUMMARY OF THE INVENTION

The invention provides apparatus for controlling the combining of video signals, the apparatus including means for generating edge data defining the edges of a polygon corresponding to edges of a first picture which is represented by a first video signal and which is to be keyed into a second picture, represented by a second video signal, to produce a composite picture. The apparatus also includes line rate microprocessor means responsive to the above-mentioned edge data to generate, for each horizontal scanning line of the composite picture in which a row of pixels corresponding to that scanning line is intersected by edges of the first picture, information representing: the horizontal locations of first and second start pixels, namely those of that row of pixels in which first and second edges, respectively, of the first picture start to intersect that row; the gradients of the first and second edges; and a key value (the proportion of the first picture to be contained in a pixel of the composite picture) for each of the first and second start pixels. Further, the apparatus includes a key value generator responsive to the above-mentioned information to generate, for each horizontal scanning line of the composite picture, a key value for each successive one of the row of pixels corresponding thereto, by: ramping up the key value from zero, for pixels preceding the first start pixel, by incrementing the key value for the first start pixel, for pixels following the first start pixel, by an amount per pixel determined by the gradient of said first edge, until the key value reaches unity; and ramping down the key value from unity, by decrementing the key value for the second start pixel, for pixels following the second start pixel, by an amount per pixel determined by the gradient of said second edge, until the key value reaches zero.

Such an apparatus avoids the need to use two-dimensional filtering to reduce the type of aliasing described above and therefore enables the achievement of hard (sharp) edges between the two pictures. The edge processing also can be carried out in real time, that is at the speed of the video signals. In this regard, the line rate processor means has to produce only one set of signals for each line and the totality of such signals for all lines enables processing of all edge-intersecting pixels to be carried out. Furthermore, instead of carrying out a separate and individual calculation for each edge-intersecting pixel in a line, which would be prohibitively slow in some cases in view of the fact that an edge very close to the horizontal could intersect several hundred pixels in a conventional video system and more than a thousand pixels in a high definition television (HDTV) system (a 1125 line system), the system need establish, for each line, only the start pixel location, start pixel key value and gradient for each edge, these being used to increment or decrement each start key value by an amount determined by the gradient whereby each edge-intersecting pixel in the row of pixels corresponding to the line can be processed in real time.

The invention also provides a method of controlling the combining of video signals. The method includes the step of generating edge data defining the edges of a polygon corresponding to edges of a first picture which is represented by a first video signal and which is to be keyed into a second picture represented by a second video signal to produce a composite picture. From that edge data, for each horizontal scanning line of the composite picture in which a row of pixels corresponding to that scanning line is intersected by edges of the first picture, there is generated information representing: the horizontal locations of first and second start pixels, namely those of that row of pixels in which first and second edges, respectively, of the first picture start to intersect that row; the gradients of the first and second edges; and a key value (the proportion of the first picture to be contained in a pixel of the composite picture) for each of the first and second start pixels. In response to the above-mentioned information there is generated, for each horizontal scanning line of the composite picture, a key value for each successive one of said row of pixels corresponding thereto, by: ramping up the key value from zero, for pixels preceding the first start pixel, by incrementing the key value for the first start pixel, for pixels following the first start pixel, by an amount per pixel determined by the gradient of said first edge, until the key value reaches unity; and ramping down the key value from unity, by decrementing the key value for the second start pixel, for pixels following the second start pixel, by an amount per pixel determined by the gradient of said second edge, until the key value reaches zero.

BRIEF DESCRIPTION OF THE DRAWINGS

The above and other objects, features and advantages of the invention will be apparent from the following detailed description of illustrative embodiments which is to be read in conjunction with the accompanying drawings, in which like references indicate like items throughout, and in which.

DESCRIPTION OF THE PREFERRED EMBODIMENTS

Figure 1:
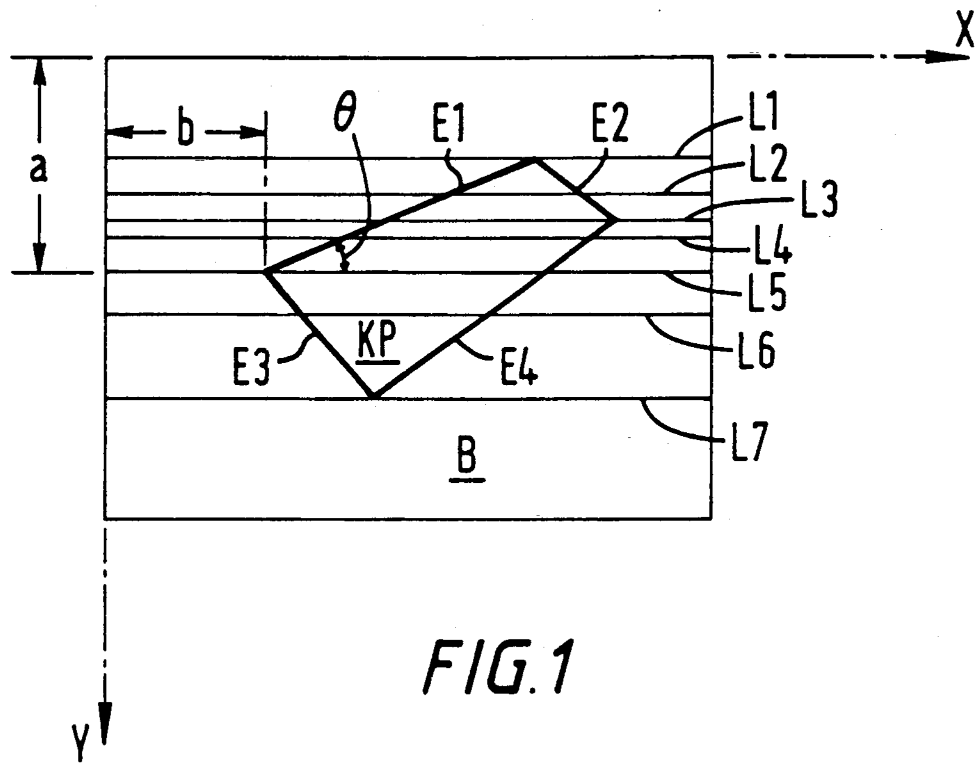
FIG. 1 shows a key picture inset into a background picture to form a composite picture.
Figure 2:
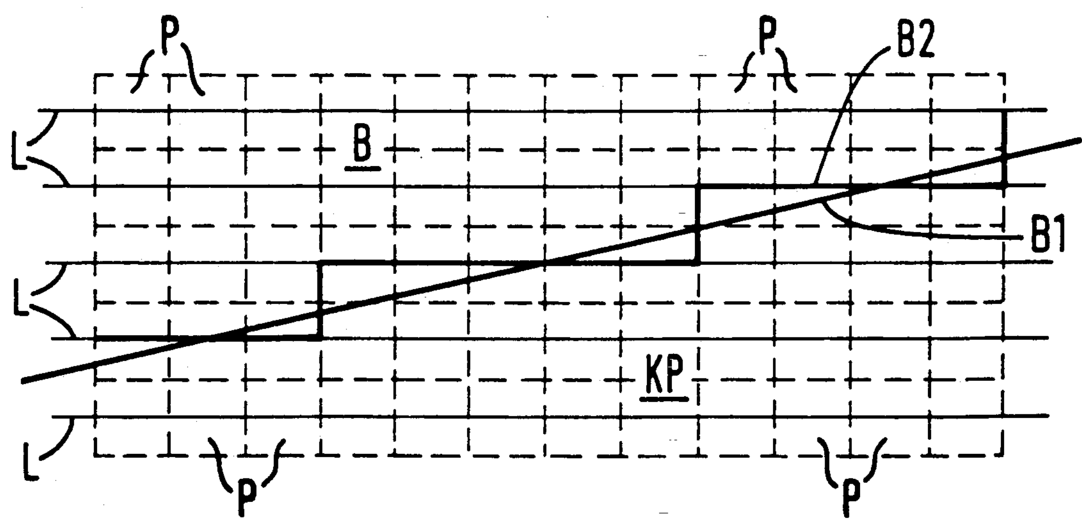
FIG. 2 shows, on an enlarged scale, part of an edge of the key picture in the composite picture.
Figure 3:
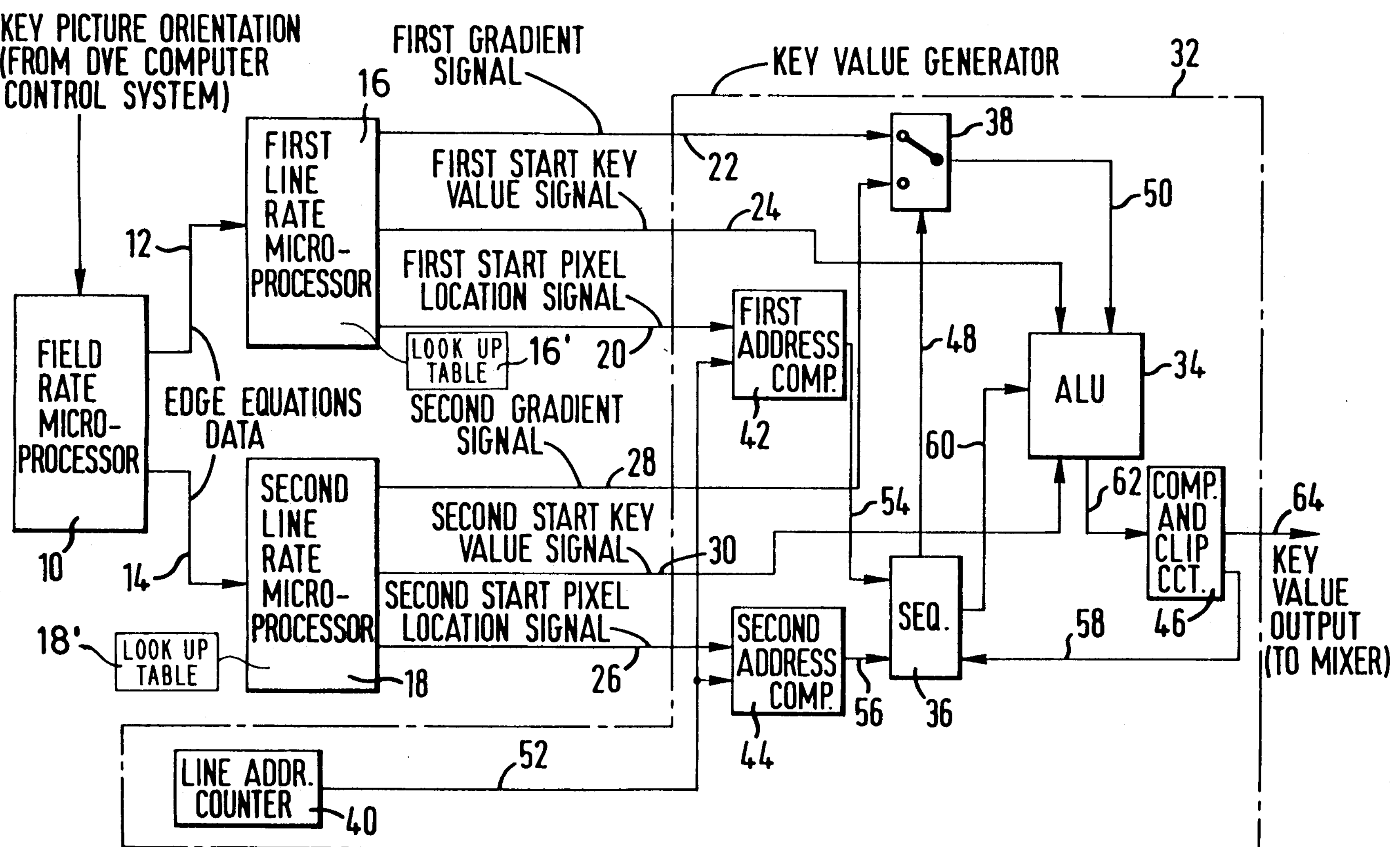
FIG. 3 shows, in block schematic form, apparatus embodying the invention for controlling the combining (mixing) of video signals representing the key and background pictures on a pixel by pixel basis to form a video signal representing the composite picture.

FIG. 3 shows an apparatus for controlling the combining of first and second video signals representing first and second pictures such that the first picture (the foreground or key picture KP of FIG. 1) is inset into the second picture (the background picture B of FIG. 1) to provide a composite picture (as shown in FIG. 1). The actual combination of the signals is effected, in a manner known per se, in a mixer (not shown). The apparatus of FIG. 3 produces, for each pixel of the composite picture, a so-called key value (the nature and derivation of which are explained below) that indicates the proportions in which the key and background pictures are to be mixed to derive a pixel of the composite picture. In other words, the apparatus produces a mixing ratio signal for the mixer on a pixel-by-basis. The key value can vary from zero (indicating that the relevant pixel of the composite picture comprises only the background picture B) to unity (indicating that the relevant pixel of the composite picture comprises only the key picture KP), these values being represented, for example, by eight bits representing a range of numbers from 0 to 255.

The background picture B can be a non-manipulated picture and be represented by a non-manipulated digital video signal. The key picture KP, however, is a picture obtained by manipulation (in a known manner) of an input video signal by digital video effects (DVE) equipment, of which the apparatus of FIG. 3 may form a part.

Computer controlled DVE equipment (not shown) receives the input video signal and manipulates it to produce the video signal representing the key picture KP. In the present case, it will be assumed for the sake of illustration that the key picture KP comprises the whole or a rectangular part of a rectangular picture represented by the input video signal and that the manipulation may comprise rotation of the rectangle about one or more of three axes (and, if desired, translation along one or more of such axes) whereby, although based on a rectangle, the key picture (as developed onto the plane of the composite picture) will in many cases have some or all of its four straight edges (E1 to E4 in FIG. 1) meeting at angles other than right angles. FIG. 1 shows one example of such manipulation, in which the basic key picture rectangle has been rotated to some extent about three axes. The DVE equipment, in a manner known per se, will store successive fields of the key picture KP in one or more field stores which correspond in pixel structure to a standard field. In other words, in the case of the particular field represented in FIG. 1 (bearing in mind that the key picture may be manipulated continuously so that the outline thereof may change from field to field), the field store contains no information for the pixels outside of the area of the key picture, and in fact contains information (namely that representing the key picture) only for the pixels included within the edges E1 to E4 of the key picture. Thus, when a field of key picture information from a key picture field store is fed to the mixer together with a field of the background picture B, the two fields being synchronised so that corresponding pixels are processed together in the mixer, the two fields are combined to produce a field of the composite picture as shown in FIG. 1. Naturally, this requires that the key value (mixing ratio) will be zero (corresponding to zero key picture KP and 100% background picture B) for the pixels located wholly outside of the key picture KP, and unity (corresponding to 100% key picture KP and zero background picture B) for the pixels locally wholly within the key picture. For these pixels intersecting the edges E1 to E4 of the key picture KP, the key values are set by the apparatus of FIG. 3 at values between zero and unity, as described in detail below, in order to at least reduce the above-described jagged edge/aliasing phenomenon.

The apparatus shown in FIG. 3 comprises a field rate microprocessor 10, the term "field rate" meaning that the microprocessor 10 has to carry out the operation described below only once per field. For each field, the microprocessor 10 is supplied by the DVE computer control system with key picture orientation information. Such information comprises the locations of the four corners of the key picture KP in an X-Y orthogonal coordinate system (the axes of which are the horizontal and vertical directions of the picture, for example as represented in FIG. 1) and is not restricted to pixel locations, being in floating point form and therefore, for practical purposes, representing the X and Y positions of each corner in an infinitely variable form.

For each field, the microprocessor 10 is operative to translate the key picture orientation information into four equations defining the respective edges E1 to E4 of the key picture. This is a matter of simple trigonometry. For example, the edge E1 in FIG. 1 is defined by the equation $y=a-(x-b)\tan\theta$, where a and b are the coordinates of the corner of the key picture KP where the edges E1 and E3 meet and $\tan\theta$ is the gradient of the edge (which can readily be computed by substracting the coordinates of the corners at the opposite ends of the edge E1). Of course, the same equation can be similarly employed for defining the other edges E2, E3 and E4. At or prior to the start of each field, data defining the equations (and therefore defining the edges E1 to E4 for that field) is supplied via lines 12, 14 to a first line rate microprocessor 16 and to a second line rate microprocessor 18. (If the data is transferred in parallel, the lines 12 and 14 will in fact be multi-bit busses. The same may apply to other connections in FIG. 3 referred to hereinafter as lines.) The term "line rate", as applied to the microprocessors 16 and 18, means that the microprocessors have to perform the operations described below for each line of each field.

Referring back to FIG. 1, it will be seen that: horizontal scanning lines of the composite picture preceding (i.e. above) a line L1 do not intersect the edges E1 to E4 of the key picture KP; all those lines between the line L1 and a line L3, for example a line L2, first intersect the edge E1 and then intersect the edge E2; all those lines between the line L3 and a line L5, for example a line L4, first intersect the edge E1 and then intersect the edge E4; all those lines between the line L5 and a line L7, for example a line L6, first intersect the edge E3 and then intersect the edge E4; and all lines subsequent to (i.e. below) the line L7 do not intersect the edges. That is to say, each scanning line either intersects none of the edges E1 to E4 or two of the edges E1 to E4. While the foregoing analysis is specific to the particular orientation of the key picture KP shown in FIG. 1, it should be appreciated that the same proposition holds true in general. That is to say, regardless of how the key picture KP is manipulated, those scanning lines between the top and bottom of the key picture will always intersect two edges of the key picture. Moreover, knowing the data defining the edges for any one field, it is a matter of simplicity to ascertain, for each scanning line, whether it intersects the edges of the key picture and, if it does, which two edges it intersects and where it intercepts them. As will now be described in more detail, the line rate microprocessors 16 and 18 take advantage of this phenomenon. Thus, for each scanning line of a field, the line rate microprocessors 16 and 18 process the edge equations data supplied thereto for that field to determine whether the row of pixels corresponding to that line is intersected by edges of the key picture. If they determine that such edge intersections will take place, the first line rate microprocessor 16 outputs information relating to the first of the two edge intersections and the second line rate microprocessor 18 outputs information relating to the second of the two edge intersections. Specifically, the first line rate microprocessor 16 outputs: on a line 20, a first start pixel location signal identifying the horizontal location of a first start pixel, namely that one of the row of pixels in which a first edge of the key picture KP starts to intersect that row; on a line 22, a first gradient signal representing the gradient of the first edge; and, on a line 24, a first start key value signal that represents the key value of the first start pixel. Similarly, the second line rate microprocessor outputs: on a line 26, a second start pixel location signal identifying the horizontal location of a second start pixel, namely that one of the row of pixels in which a second edge of the key picture KP starts to intersect that row; on a line 28, a second gradient signal representing the gradient of the second edge; and, on a line 30, a second start key value signal that represents the key value of the second start pixel. The above signals produced, for each scanning line, by the line rate microprocessors 16 and 18, are applied to a key value generator 32 that uses the signals to produce a key value for every one of the pixels of the row, the key values being supplied to the mixer, as explained above, to control combination or mixing of the video signals representing the background picture B and the key picture KP. It should be noted that the foregoing signals may be produced by the line rate microprocessors 16 and 18 for all of the scanning lines, though in the case of scanning lines in which no edge intersections take place the values of the signals are such as effectively to indicate to the key value generator 32 that there are no intersections. Specifically, the values of the first and second start pixel locations for the lines can be set to values indicating imaginary or invalid pixel locations that are beyond the right hand edge of the background picture, i.e. "off-screen" pixel locations.

The key value generator 32 comprises an arithmetic and logic unit (ALU) 34 and, controlling the operation of the ALU, control means constituted by a sequencer 36, a switch 38, a line address counter 40, first and second addres comparators 42 and 44 and a comparator and clip circuit 46.

The lines 22 and 28 carrying the first and second gradient signals are connected to respective inputs of the switch 38 whereby, under the control of the sequencer 36 via a line 48, the switch 38 can apply either of the first and second gradient signals (via a line 50) to the ALU 34 at any one time. The lines 24 and 30 carrying the first and second start key value signals are connected directly to the ALU 34. The lines 20 and 26 carrying the first and second start pixel location signals are connected to first inputs of the first and second address comparators 42 and 44, respectively. Second inputs of the first and second address comparators 42 and 44 are connected by a line 52 to receive an output signal from the line address counter 40. Lines 54 and 56 connect outputs of the first and second address comparators 42 and 44, respectively, to respective inputs of the sequencer 36. Another input of the sequencer 36 is connected via a line 58 to receive a signal fed back from the comparator and clip circuit 46. An output of the sequencer 36 controls the operation of the ALU 34, as described below, via a control line 60. For each pixel of each line of a field, the ALU 34 outputs a key value on a line 62. Each key value on the line 62 is fed via the comparator and clip circuit 46 (in which, as described below, it is compared with reference values and (optionally) clipped) to a line 64 that supplies the key values to the mixer.

The apparatus of FIG. 3 operates in the following manner for a field having the particular key picture KP shown in FIG. 1 (and in an analogous manner in fields containing different key pictures). As explained above, the edge equations data defining the current edges E1 to E4 of the key picture KP is inputted by the field rate microprocessor 10 to the first and second line rate microprocessors 16 or 18 at or prior to the start of the field. Prior to the start of the first line of the field, the microprocessors 16 and 18 process the edge equations data to produce, for that line, values for the first and second gradient signals, first and second key value signals and first and second start pixel location signals. The values of those signals (more specifically the values of the first and second start pixel location signals) indicate, as explained above, whether the row of pixels corresponding to that line is intersected by edges of the key picture. In the case of FIG. 1, no such intersections occur for the first line. Therefore, during that line, the values of the gradient, start key value and pixel start location signals outputted by the line rate microprocessors 16 and 18 on their output lines 20, 22, 24, 26, 28 and 30 (more specifically the values of the start pixel location signals on the lines 20 and 26) are such as to indicate that no intersections occur and the sequencer 36 causes the ALU 34 to remain, throughout that line, in a static state in which it performs an operation according to which, for each pixel, the ALU applies to the line 62 a key value of zero which is applied via the comparator and clip circuit 46 to the line 64 and passed to the mixer whereby, for all of that line, the composite picture comprises the background picture only. For each pixel, the key value applied to the line 62 by the ALU 34 is compared in the comparator and clip circuit 46 with a reference value of unity and a reference value of zero, and the result of the comparison (key value=unity or key value=zero) is fed back to the sequencer 36 via the line 58. Thus, for each pixel of the first line, the signal fed back to the sequencer 36 via the line 58 indicates that the key value is zero. This has the effect of causing the sequencer 36 to keep the ALU 34 in the above-mentioned static state.

The above process is repeated for all the lines down to the line L1 in FIG. 1, the ALU 34 remaining in the static state in which it applies a stream of key values each of value zero to the line 64 extending to the mixer. When, however, the current scanning line starts to intersect the edges of the key picture KP, the ALU 34 starts to perform arithmetical operations to generate different key values for different pixels.

Figure 4:
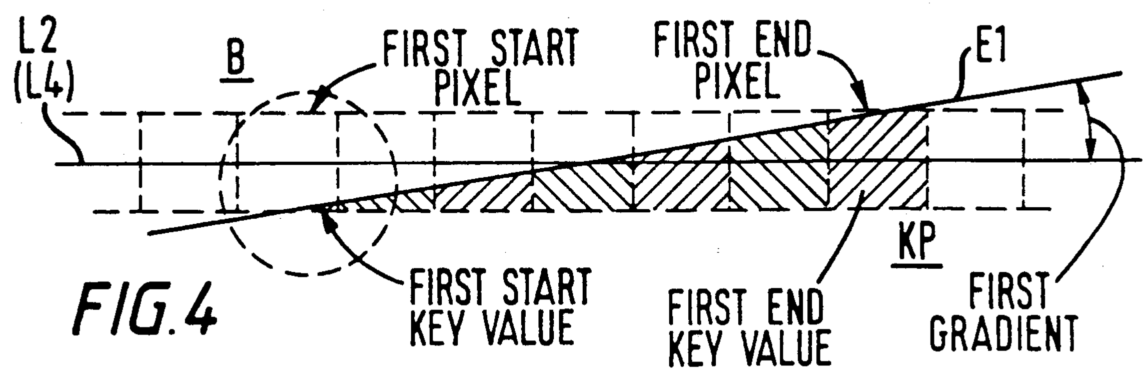
FIG. 4 shows the intersection of a first edge of the key picture with a row of pixels corresponding to a horizontal scanning line of the composite picture.
Figure 5:
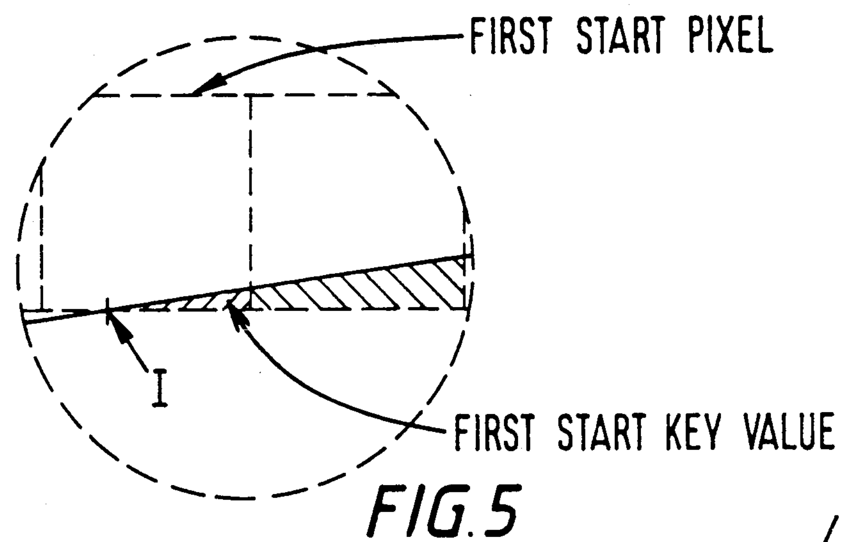
FIG. 5 is an enlarged view of a portion of FIG. 4 enclosed within a dotted-line circle in FIG. 4.
Figure 7:
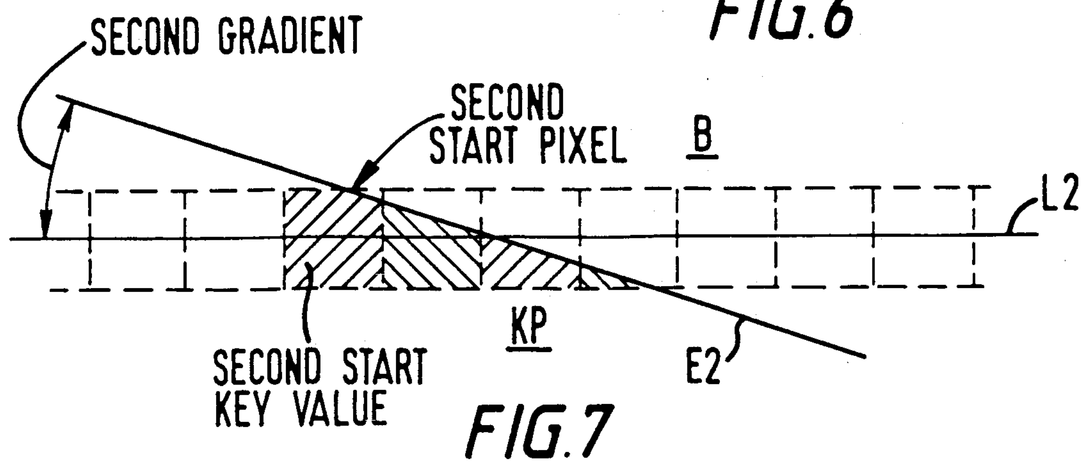
FIG. 7 shows the intersection of a second edge of the key picture with the same row of pixels shown in FIG. 4.

Consider first the scanning line L2, in which the corresponding row of pixels is intersected by the edge E1 (as shown in FIGS. 4 and 5) and, later on, by the edge E2 (as shown in FIG. 7). During the preceding scanning line, the line rate microprocessors 16 and 18 have calculated values for the first and second gradient signals, first and second pixel start location signals and first and start key value signals for the line L2. (Since intersections will take place in the line L2, the values of the first and second start pixel location signals signify or represent real or "on-screen" pixel locations.) These signals are outputted by the microprocessors 16 and 18 at or just prior to the start of the line. At or prior to the start of the line, the switch 38 is put by the sequencer 36 into the condition illustrated in FIG. 3 whereby the first gradient signal is applied to the ALU 34 via the line 50. Also, both the first and second start key value signals are applied (via the lines 24 and 30) to the ALU 34 so that the key values they represent are ready to be loaded therein.

The line address counter 40 outputs a signal representing the addresses of successive pixels along the line 52. That is, the signal produced by the counter 40 indicates the current pixel position along the current line, in the present case the line L2. That signal is compared in the first address comparator 42 with the address or location of the first start pixel, that is the first pixel in which the edge E1 of the key picture intersects the row of pixels corresponding to the line L2. Prior to the comparator 42 detecting that the current pixel is the first start pixel, the sequencer 36 causes the ALU 34 to be in the above-described static state in which it outputs a key value of zero for each pixel. When the comparator 42 detects that the current pixel is the first start pixel, it produces a signal on the line 54 and the sequencer 36 is responsive thereto to cause the ALU 34, via the control line 60, to go into another state. The ALU 34 loads the first key value represented by the first start key value signal and, for the current pixel (the first start pixel), outputs a key value equal to that represented by the first start key value signal. Then, for each successive pixel, the ALU 34 ramps up the key value by incrementing it by a predetermined amount per pixel whose magnitude is determined by the magnitude of the gradient of the edge E1 as indicated by the first gradient signal. Each such successive pixel key value outputted by the ALU 34 on the line 62 is passed via the comparator and clip circuit 46 to the line 64 and thence to the mixer whereby the key value for the successive pixels is incremented towards unity as the location of the current pixel, intersecting the edge E1, goes further towards the key picture, whereby jaggedness/aliasing of the composite picture at edge E1 is subjectively substantially wholly suppressed and a hard edge is obtained. Each such successive pixel key value is compared in the comparator and clip circuit 46 with the above-mentioned zero and unity reference key values. When that comparison operation indicates that the key value has ramped up (i.e. been incremented) to unity by the ALU 34, signifying that the key value generator 32 believes that the current pixel is located wholly within the key picture KP whereby the intersection of the edge E1 has been completed and no further incrementation of the key value is needed, the signal representative thereof on the line 58 causes the sequencer 36 to control the ALU 34 (via the line 60) to put it back into its static state in which it provides a fixed key value output for succeeding pixels and performs no arithmetical operations, though in the present case that fixed value is unity since the pixels in question are within the key picture KP. The sequencer 36 is also responsive to the signal on the line 58 to change over the switch 38.

The above-described key value ramping up or incrementation process can be understood more fully by referring to FIGS. 4 and 5. FIG. 4 shows a region of the row of pixels corresponding to the line L2 which includes those pixels intersected by the edge E1 of the key picture. It was explained above that the signal produced on the line 20 by the line rate microprocessor 16 indicates the location or address (i.e. the position along the line L2) of the first start pixel, that is the pixel in which the edge E1 starts to intersect the row of pixels corresponding to the line L2. Calculation of the start pixel location clearly is a matter of elementary geometry based on the equation for the edge E1 since it involves only calculation of the horizontal coordinate point represented at I in FIG. 5 where the edge E1 intersects the line defining the lower boundary of the row of pixels, which is located half of a pixel height below the current scanning line. (Clearly, knowledge of the horizontal coordinate of the point I indicates that pixel along the row in which it is located.) It was also explained above that the signal produced on the line 24 by the line rate microprocessor 16 represents the key value of the first start pixel. How the key value of the first start pixel is calculated will now be explained in more detail.

As indicated above, the key value represents the proportion of the first picture to be contained in a pixel of the composite picture. As will be appreciated, the key value for any pixel thus can be considered to be the area of that pixel (relative to its whole area), or the proportion of the whole area of the pixel, that falls inside of the key picture. Thus, for each of those seven (for example) pixels in FIG. 4 that are intersected by the edge E1, namely for the first start pixel and the six following pixels, the key value is the shaded area divided by the whole area. (The key value for the previous pixels is, of course, zero, and that for the following pixels is unity.)

Clearly, knowing the locations of the pixels and the location of the edge E1, it would be a matter of mathematical simplicity to identify all of the pixels intersected by the edge E1 and to calculate precisely a key value for each of them. However, while these operations of identifying all of the pixels and calculating their key areas are simple, they are also very time-consuming. In this regard, it has to be borne in mind that a key picture edge inclined so as to be very near to the horizontal may intersect up to several hundred pixels in a conventional (525 or 625 line) video system and up to a figure approaching two thousand pixels in an HDTV (1125 line system); and that this figure might have to be doubled if both key picture edges crossing the line are close to the horizontal. It is technically unfeasible, at least with current technology, to perform all such calculations within one video signal line period. To avoid this difficulty, the present apparatus does not identify all the pixels crossed by the edge E1 and does not, at least directly, individually calculate a key value for each of them. Rather, it performs these operations in an indirect manner (explained below) that enables them to be performed in real time.

In this regard, the line rate microprocessor 16 computes the key value for the first start pixel (and indicates the value thereof by the signal it applies to the line 24) by computing the actual area (that is shown shaded) of the first start pixel that falls within the key picture KP, relative to the whole pixel area. The line rate microprocessor 16 also calculates the gradient of the edge 16 (i.e. tan $\theta$ for the edge E1 in the example of FIG. 1) and indicates the value thereof by the signal it applies to the line 22. Now, as can be understood from examining FIG. 4, and ignoring for a moment the first start pixel and the last of the pixels intersected by the edge E1, the increase in the shaded area (and therefore the increase in the key value) between each successive pair of pixels is identical and, what is more, is directly proportional to the gradient (e.g. tan $\theta$ for the edge E1 in the example of FIG. 1) of the edge. (Specifically, the change in area is equal to $W^2$. tan $\theta$, where W is the pixel width and tan $\theta$ is the gradient.) The preseent apparatus, instead of identifying all the pixels intersecting the edge E1 and calculating their respective key values, identifies and calculates the key value for the start pixel only and then, in the key value generator 32, increments the key value for the first start pixel, for pixels following the first start pixel, by an amount per pixel determined by the gradient of the first edge, until the key value has been ramped up or incremented to unity. The fact that only this small number of calculations is effected enables them to be carried out within a single video signal line period whereby the apparatus can process the signal in real time.

For the following reason, the foregoing technique, if carried out exactly as so far described, is slightly approximate. Thus, as will be appreciated from a careful study of FIGS. 4 and 5, unless the point I happens to coincide precisely with a boundary between two adjacent pixels in the row the changes in shaded area (and therefore the changes in key value) between the start pixel and the following pixel, and between the last two pixels intersected by the edge E1, will be different than the identical change between the other successive pairs of pixels intersected by the edge E1. Furthermore, consequentially thereto, the pixel in the row identified (by virtue of its incremented key value having reached unity) as being the first falling wholly within the key picture KP may not coincide precisely with the first pixel actually falling wholly within the key picture. Nonetheless, the inaccuracy would probably in most cases be subjectively indiscernible or scarcely discernible in the composite picture and, in any event, is a small price to pay to enable the operation to be carried out on a real time basis. However, by using the enhancement of the technique described below, the above inaccuracy may be greatly reduced.

According to the enhancement, each of the microprocessors 16 and 18 calculates (as before) the start pixel location or address and the start key value (the key value of the start pixel) and (as before) produces a start pixel location signal and a start key value signal that represent, respectively, the start pixel location or address and the start key value. Further, as before, each microprocessor 16 and 18 produces a gradient signal. However, the gradient represented by the gradient signal is adapted slightly with respect to the actual gradient of the relevant one of the edges E1 to E4 of the key picture in such a manner as to take account of the exact position at which the edge crosses the row of pixels and thereby to compensate at least partially for the above-mentioned possible slight inaccuracy.

Each of the microprocessors 16 and 18 calculates the adapted value for the gradient as follows. As well as calculating the start pixel location and start key value, it calculates an end pixel location or address and an end key value, namely the location or address and key value of that pixel ("the end pixel") in the of row of pixels corresponding to the current scanning line in which the intersection of the relevant edge of the key picture with the row ends. (The end pixel location and end key value can be calculated in a manner exactly analogous to that in which the start pixel location and start key value are calculated.) Further, each of the microprocessors 16 and 18 calculates the difference between the start and end pixel locations, i.e. the number N of pixels over which the key value has to be incremented (or decremented) from the start key value. (Thus, in the case of (for example) FIG. 4, the line rate microprocessor 16 additionally calculates a first end key value by calculating the area of the first end pixel, and subtracts the locations or addresses of the first start and end pixels to provide the number N, which is equal to 6 in the case of FIG. 4). Then, each of the microprocessors 16 and 18 produces the adapted gradient by calculating the difference between the start and end key values and dividing the difference by the number N. The resultant adapted gradient is precisely equal to the actual gradient of the relevant edge of the key picture if the edge happens to cross the row of pixels exactly on boundaries between adjacent pixels. Otherwise, it differs slightly from the gradient in a sense that takes account of the actual position (to sub-pixel accuracy) at which the edge crosses the row of pixels to take account of the fact that the change in key values between the start pixel and the next pixel, and between the end pixel and the preceding pixel, differs from the change between other pixels (if any). Thus, when such an adapted gradient is used, in place of the actual gradient, to produce one or both of the gradient signals outputted by the line rate microprocessors 16 and 18 in the apparatus of FIG. 3, the above-mentioned slight inaccuracy is greatly reduced.

As will be evident, the above-described enhancement increases the amount of processing that has to be performed in the line rate microprocessors 16 and 18 for every scanning line. Nonetheless, a sufficient processing speed has been found achievable with state of the art microprocessors, at least when the usage of the enhancement is limited as explained below.

As should by now be evident, the extent of the above-mentioned slight inaccuracy (in the absence of the above-described enhancement) will depend upon the number of pixels crossed by the relevant edge of the key picture and therefore upon the gradient of that edge. Thus, for a small gradient (in which the edge crosses many pixels) the inaccuracy will in general be negligible, whereas for a larger gradient in which the edge crosses, say, 2 or 3 pixels, the inaccuracy is more likely to be discernible whereby the enhancement is, in this case, of more value. Preferably, therefore, the enhancement is employed only when the gradient of the relevant edge exceeds (as determined in the relevant line rate microprocessor) a predetermined limit stored in the line rate processors 16 and 18. The predetermined limit may, for instance, be about 0.1, whereby the unenhanced technique is used for gradients of less than about 0.1 (when more than 10 pixels are crossed by an edge) and the enhanced technique is used for gradients of more than about 0.1 (when 10 or fewer pixels are crossed by an edge).

Figure 6:
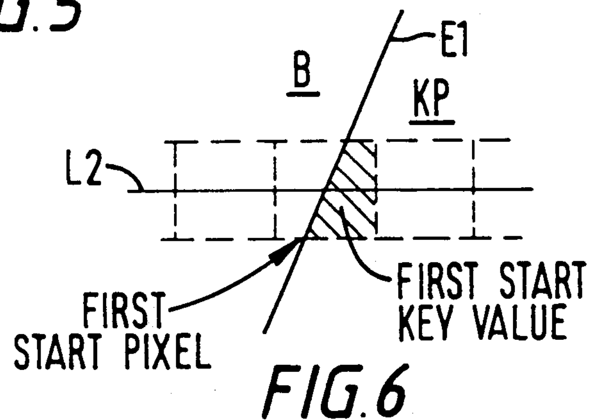
FIG. 6 is a view corresponding to FIG. 4, but showing a case in which the first edge is inclined less closely to the horizontal than in FIG. 4.

When the gradient is greater than 1.0 (i.e. $\theta > 45°$ whereby $\tan\theta > 1.0$), the edge will cross either one pixel or two pixels. FIG. 6 shows a case in which the edge E1 (say) has a gradient of more than 1.0 and crosses one pixel (the first start pixel) only. That is, the edge E1 both starts to intersect and finishes intersecting the row of pixels corresponding to the line L2 in that one pixel. Nonetheless, the apparatus functions as before. Thus, in the case of FIG. 6, a key value between zero and unity (specifically, the first start pixel key value) is generated only for the first start pixel, the key value being ramped up to unity in the immediately following pixel. In a case such as that of FIG. 6, where the edge crosses one pixel only, the value of the above-mentioned number N will be zero. To prevent this giving rise to a undefined value for the adapted gradient, which is computed by dividing the difference between the start and end key values by the number N, a suitable corrective measure (such as limiting the minimum value of N to unity) may be taken.

To summarise the above-mentioned preferred form of implementation of the apparatus of FIG. 3, the unenhanced technique is used for gradients of less than (say) about 0.1 and the enhanced technique is used for gradients of greater than about (say) 0.1. Thus, the gradient signal produced by each of the line rate microprocessors 16 and 18 represents the exact gradient of the relevant edge of the key picture KP where the gradient is less than (say) about 0.1, and represents the adapted gradient (which differs slightly from the exact gradient by an amount corresponding to where, to sub-pixel accuracy, the edge crosses the row of pixels) where the gradient is greater than (say) about 0.1.

Limitation of the range of gradient values over which the enhanced technique is used may, for the following reason, ease the processing burden on the line rate microprocessors 16 and 18. If the enhanced technique is used for gradients of greater than (say) 0.1, the value of the above-mentioned number N (the number of pixels over which the key value has to be incremented or decremented) will range from about 10 down to 1. As explained above, the difference between the start and end key values has to be divided by the number N. In practice, the line rate microprocessors 16 and 18 may operate faster if they instead multiply the difference by 1/N. To further increase speed, the line rate microprocessors 16 and 18 may comprise look-up tables 16' and 18', respectively, storing a value of 1/N for each possible value of N, whereby 1/N does not have to be calculated. The use, therefore, of a limited possible range of values for N makes this approach more feasible in that it reduces the number of values of 1/N that have to be stored.

Whatever combination of the enhanced and unenhanced techniques is used, or even if only the enhanced technique is used, account has to be taken of the fact that as the relevant edge approaches the vertical, the gradient approaches infinity. (That is, as $\theta \rightarrow 90°$, tan $\theta \rightarrow \infty$). Each of the line rate microprocessors 16 and 18 therefore will compute the gradient of the relevant edge in such a manner as to limit the gradient to a maximum value corresponding to the edge being inclined to the horizontal by an angle approaching 90°.

Reverting to the description of operation of the apparatus of FIG. 3, it will be recalled that the intersection of the edge E1 of the key picture KP with the row of pixels corresponding to the line L2 has been completed and the ALU 34 is in a static state in which, since the key picture KP has been entered, it outputs key values of unity for successive pixels. Also, the switch 38 has been changed over whereby the second gradient signal, produced on the line 28 by the second line rate microprocessor 18, is applied to the ALU 34.

When the second address comparator 44 indicates to the sequencer 36 by a signal on the line 56 that the current pixel is the second start pixel, the sequencer causes the ALU 34 to go into the other state. The ALU 34 loads the second key value represented by the second start key value signal on the line 30 and, for the current pixel (the second start pixel), outputs a key value equal to that represented by the second start key value signal. Then, for each successive pixel, the ALU 34 ramps down the key value by decrementing it by a predetermined amount per pixel whose magnitude is determined by the gradient of the edge E2 as indicated by the second gradient signal. Each such successive pixel key value outputted by the ALU 34 on the line 62 is passed via the comparator and clip circuit 46 to the line 64 and thence to the mixer, whereby the key value for the successive pixels is decremented towards zero as the location of the current pixel, intersecting the edge E2, goes further towards the background picture B, whereby jaggedness/aliasing of the composite picture at the edge E2 is subjectively substantially wholly suppressed and a hard edge is obtained. Each such successive pixel key value is compared in the comparator and clip circuit 46 with the above-mentioned zero and unity reference key values. When that comparison operation indicates that the key value has been ramped down (i.e. been decremented) to zero by the ALU 34, signifying that the key value generator 32 believes that the current pixel is located wholly within the background picture B whereby the intersection of the edge E2 has been completed and no further decrementation of the key value is needed, the signal representative thereof on the line 58 causes the sequencer 36 to control the ALU 34 (via the line 60) to put it back in its static state in which it provides a fixed key value output of zero for succeeding pixels and performs no arithmetical operations. The ALU 34 remains in this state for the rest of the line L2. The sequencer 36 is also responsive to the signal on the line 58 to change over the switch 38 back to its illustrated condition, ready for the next scanning line.

The above-described process of ramping down or decrementation of the key value when the pixels corresponding to the line L2 are intersected by the edge E2 is illustrated in FIG. 7 and is carried out in a manner which is precisely analogous to that in which the key value is ramped up or incremented when the pixels corresponding to the line L2 are intersected by the edge E1. Thus, the line rate microprocessor 18 calculates the location of the second start pixel, the key value (area shaded in FIG. 7) of the second start pixel and the gradient (or adapted gradient) of the edge E2, and the key value generator 32 decrements the second start pixel key value towards zero in a manner exactly analogous to that in which it previously incremented the first start pixel towards unity.

The foregoing description of operation of the apparatus of FIG. 3 referred to the line L2 that intersects the edges E1 and E2 of the key picture KP. As was explained above, in other regions of the key picture KP a scanning line will intersect with different pairs of the edges E1 to E4 of the key picture KP.

Figure 8:
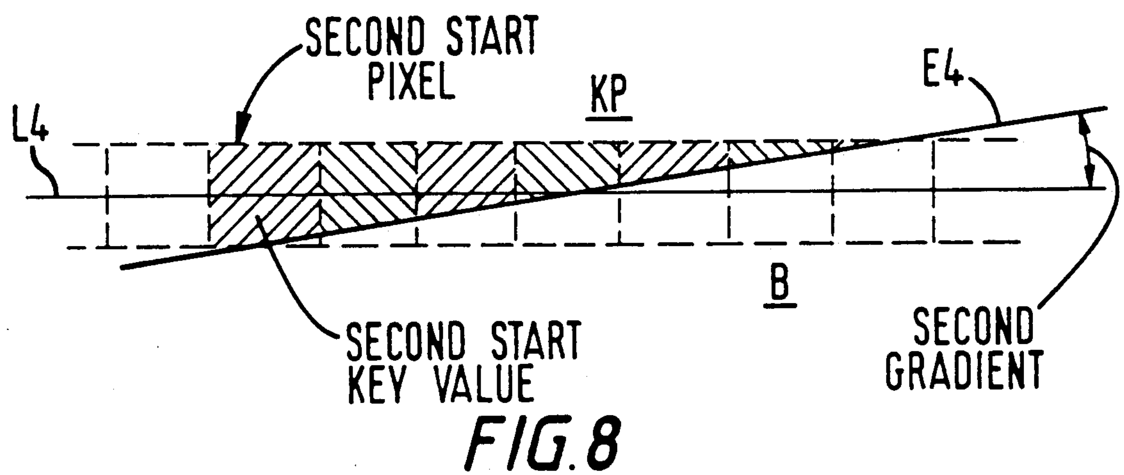
FIG. 8 is a view corresponding to FIG. 7, but for a different scanning line.

Thus, the line L4 (between the lines L3 and L5) intersects the edges E1 and E4. The intersection of the line L4 with the edge E1 will be similar to that of the line L2 with the edge E1, as represented in FIGS. 4 and 5. The intersection of the line L4 with the edge E4 is represented in FIG. 8. It will be seen from FIG. 8 that, although the sense of the gradient of the edge E4 is opposite to that of the edge E2 in FIG. 7, it is nonetheless still necessary to decrement the key value as from the second start pixel whereby, in the case of the line L4, the decrementation operation performed by the key value generator 32 in response to the signals generated by the second line rate microprocessor 18 is the same as that performed in the case of the line L2, though the information contained in the signals from the microprocessor 18 is, of course, different, and relates to the edge E4 rather than the edge E2.

Figure 9:
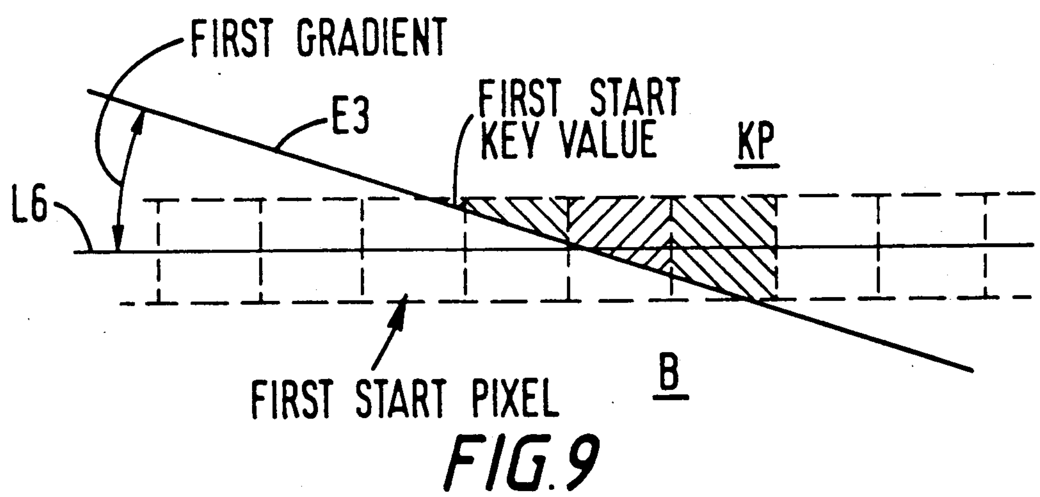
FIG. 9 is a view corresponding to FIG. 4, but for yet another scanning line.

Further, in another region of the key picture KP between the lines L5 and L7, the line L6 (for example) intersects the edges E3 and E4. In this case, the first and second intersections are as represented in FIGS. 9 and 8, respectively, and it will be seen from FIG. 9 that, although the sense of the gradient of the edge E3 is opposite to that of the edge E1 in FIG. 4, it is nonetheless still necessary to increment the key value as from the first pixel whereby, in the case of the line L6, the incrementation operation performed by the key value generator 32 in response to the signals generated by the first line rate microprocessor 16 is the same as that performed in the case of the line L2, though the information contained in the signals from the microprocessor 16 is, of course, different, and relates to the edge E3 rather than the edge E1.

As described so far, the apparatus enables the key or foreground picture KP to be combined (mixed) with the background picture B so that, in the area of the key picture, only the key picture is visible. However, use of the clipping feature provided (optionally) in the comparator and clip circuit 46 affords the possibility of a variation. Thus, if the key values outputted to the line 64 are clipped to a value less than unity, this will have the effect that, in the area of the key picture KP, the key picture and the background picture B appear mixed or cross-faded together. If, for example, the comparator and clip circuit 46 includes means enabling the clipping level to be increased over successive fields from zero to unity, this will have the effect that the key picture KP is faded up gradually into the background picture B rather than being switched abruptly into the background picture.

The invention can of course be carried into effect in other ways than that described above by way of example.

For instance, the field rate microprocessor 10 and line rate microprocessors 16 and 18 can be programmed to deal with other than four-sided key picture shapes such as rectangles and squares. Thus, in general, the apparatus can be designed to deal with any shape of key picture that can be defined by three or more straight or substantially straight edges; that is, any polygonal picture.

Further, it is possible that, in same cases, the first and second line rate microprocessors 16 and 18 could be replaced by a single line rate microprocessor. This would depend on whether a single line rate microprocessor were sufficiently fast to produce, in one line period, the signals provided in the above-described arrangement by the two separate line rate microprocessors.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for controlling the combining of video signals, so as to produce a composite picture in which a first picture represented by a first video signal is inserted into a second picture represented by a second video signal with such composite picture having a plurality of horizontal scanning lines, and each of said scanning lines including a row of pixels, said apparatus comprising:

generating means for generating edge data defining respective edges of a polygon which correspond to edges of said first picture;

line rate microprocessor means responsive to said edge data to generate information for each horizontal scanning line of said composite picture in which the row of pixels corresponding to the respective scanning line is intersected by edges of said first picture, said information representing horizontal locations of first and second start pixels, said first and second start pixels being pixels in which first and second edges, respectively, of said first picture start to intersect said row of pixels corresponding to said respective scanning line; gradients of said first and second edges; and a start key value for each of said first and second start pixels which is equal to a proportion of said first picture to said composite picture contained in said first and second start pixels, respectively; and key value generator means responsive to said information for each horizontal scanning line of said composite picture to generate a respective key value for each successive pixel in the respective row of pixels in which the key values for pixels preceding said first start pixel are zero, said key values for pixels following said first start pixel are incremented by an amount per pixel determined by said gradient of said first edge until the key value reaches a value of unity; and said key values for pixels following said second start pixel are decremented by an amount per pixel determined by said gradient of said second edge until the key value reaches zero.

2. Apparatus according to claim 1, wherein said generating means includes a field rate microprocessor for receiving information indicative of the orientation of said first picture for each field and for generating said edge data for each field of said first picture.

3. Apparatus according to claim 2, wherein said field rate microprocessor generates said edge data for each field of said first picture in the form of equations which define said respective edges.

4. Apparatus according to claim 1, wherein said line rate microprocessor means includes a first line rate microprocessor responsive to said edge data for generating said information representing the horizontal location of said first start pixel, the gradient of the first edge and said start key value of the first start pixel, and a second line rate microprocessor responsive to said edge data for generating said information representing the horizontal location of said second start pixel, said gradient of the second edge and said start key value of said second start pixel.

5. Apparatus according to claim 1, wherein said line rate microprocessor means generates said information representing said gradients of each of said first and second edges by:

generating information that represents the actual gradient if the gradient is less than a predetermined value; and if said gradient is greater than said predetermined value, generating information that represents an adapted gradient by calculating the horizontal location of an end pixel, said end pixel being the pixel in said row of pixels in which the respective edge stops intersecting said row of pixels, calculating a key value for said end pixel, calculating the difference between the key values for the respective start and end pixels and dividing said difference by the difference (N) between the horizontal locations of said respective start and end pixels.

6. Apparatus according to claim 5, wherein said predetermined value is approximately 0.1.

7. Apparatus according to claim 5, wherein said line rate microprocessor means includes a look-up table for storing a value of 1/N for each possible value of said difference N and in which said line rate microprocessor means performs the division of the key value difference by said difference N by multiplying said key value difference by the respective value of 1/N obtained from said look-up table.

8. Apparatus according to any one of the preceding claims, wherein said key value generator means includes:

an arithmetic and logic unit for performing the incrementing and decrementing of said key values in response to said information representing said gradients of said first and second edges and said start key values of said first and second start pixels; and control means for controlling the operation of said arithmetic and logic unit in response to said information representing said horizontal locations of said first and second start pixels.

9. Apparatus according to claim 8, wherein said control means includes:

a line address counter for generating a line address signal indicating the current pixel position along the respective horizontal scanning line;

a first address comparator for comparing said line address signal and said information representing said horizontal location of said first start pixel and for producing an output signal when said current pixel is said first start pixel;

a second address comparator for comparing said line address signal and said information representing said horizontal location of said second start pixel and for producing an output signal when said current pixel is said second start pixel;

a sequencer for causing said arithmetic and logic unit to start said incrementing of said key values in response to said output signal from said first address comparator and for causing said arithmetic and logic unit to start said decrementing of said key values in response to said output signal from said second address comparator; and a key value comparator for comparing said key values generated by said arithmetic and logic unit with unit and zero and, when said key values are substantially equivalent to unity or zero, for producing a signal indicative thereof;

said sequencer responsive to said signal produced by said key value comparator for causing said arithmetic and logic unit to terminate said incrementing of said key values when said signal produced by said key value comparator indicates that the current key value has reached unity and for causing said arithmetic and logic circuit to terminate said decrementing of said key values when said signal produced by said key value comparator indicates that the current key value has reached zero.

10. Apparatus according to claim 1, wherein said key value generator means includes clipping means for clipping the generated key values to a value that is less than unity.

11. A method of controlling the combining of video signals, so as to produce a composite picture in which a first picture represented by a first video signal is inserted into a second picture represented by a second video signal, with such composite picture having a plurality of horizontal scanning lines, and each of said scanning lines including a row of pixels, said method comprising the steps of:

generating edge data defining respective edges of a polygon which correspond to edges of said first picture;

generating information from said edge data for each horizontal scanning line of said composite picture in which the row of pixels corresponding to the respective scanning line is intersected by edges of said first picture, said information representing horizontal locations of first and second start pixels, said first and second start pixels being pixels in which first and second edges, respectively, of said first picture start to intersect said row of pixels corresponding to said respective scanning line; gradients of said first and second edges; and a start key value for each of said first and second start pixels which is equal to a proportion of said first picture to said composite picture contained in said first and second start pixels, respectively; and generating in response to said information for each horizontal scanning line of said composite picture a respective key value for each successive pixel in the respective row of pixels in which the key values for pixels preceding said first start pixel are zero, said key values for pixels following said first start pixel are incremented by an amount per pixel determined by said gradient of said first edge until the key value reaches a value of unity; and said key values for pixels following said second start pixel are decremented by an amount per pixel determined by said gradient of said second edge until the key value reaches zero.

12. A method according to claim 11, wherein said edge data are generated for each field of said first picture from information indicative of the orientation of each field of said first picture.

13. A method according to claim 12, wherein said edge data generated for each field of said first picture are in the form of equations which define said respective edges.

14. A method according to claim 12, wherein the step of generating information representing said gradients of each of said first and second edges includes:

generating information that represents the actual gradient if the gradient is less than a predetermined value; and if said gradient is greater than said predetermined value, generating information that represents an adapted gradient by calculating the horizontal location of an end pixel, said end pixel being the pixel in said row of pixels in which the respective edge stops intersecting said row of pixels, calculating a key value for said end pixel, calculating the difference between the key values for the respective start and end pixels and dividing said difference by the difference (N) between the horizontal locations of said respective start and end pixels.

15. A method according to claim 14, wherein said predetermined value is approximately 0.1.

16. A method according to claim 14, wherein the division of the key value difference by said difference N is performed by multiplying said key value difference by the respective value of 1/N obtained from a look-up table, said look-up table storing a value of 1/N for each possible value of said difference N.

17. A method according to claim 11, in which the step of generating a respective key value includes clipping the generated key values to a value that is less than unity.

* * * * *